United States Patent [19]
Yeckley

[11] Patent Number: 4,904,624
[45] Date of Patent: Feb. 27, 1990

[54] SILICON NITRIDE WITH IMPROVED HIGH TEMPERATURE STRENGTH

[75] Inventor: Russell L. Yeckley, Oakham, Mass.

[73] Assignee: Norton Company, Worcester, Mass.

[21] Appl. No.: 144,458

[22] Filed: Jan. 15, 1988

Related U.S. Application Data

[63] Continuation-in-part of Ser. No. 923,948, Oct. 28, 1986.

[51] Int. Cl.$^4$ .............................................. C04B 35/58
[52] U.S. Cl. ........................................ 501/97; 501/98; 264/65; 264/66
[58] Field of Search ...................... 501/97, 98; 264/65, 264/66

[56] References Cited

U.S. PATENT DOCUMENTS 4,560,669 12/1985 Matsuhiro et al. ................... 501/97

OTHER PUBLICATIONS

Pp. 120–127, Materials Evaluation Ceramic Materials for Advanced Heat Engines (1985), D. C. Larsen et al.

Primary Examiner—William R. Dixon, Jr.
Assistant Examiner—David M. Brunsman
Attorney, Agent, or Firm—Arthur A. Loiselle, Jr.

[57] ABSTRACT

The flexural strength and stress rupture life of isostatically hot pressed silicon nitride containing between 1 and 12 weight percent of rare earth oxide and not more than 0.5 weight percent alumina is substantially increased by treating green bodies in flowing nitrogen at a temperature between 1000° and 1500° C. before degassing for the isostatic hot pressing. The iron content of the bodies is also reduced by this heat treatment, and this is believed to eliminate sources of fracture failure. Silicon nitride bodies with a flexural strength in excess of 525 MPa at 1370° C. and with stress rupture lives reliably in excess of 200 hours at 300 MPa stress at 1370° C. can be prepared in this way. The strain rates of silicon nitride under high temperature stress can also be reduced.

20 Claims, No Drawings

SILICON NITRIDE WITH IMPROVED HIGH TEMPERATURE STRENGTH

CROSS REFERENCE TO RELATED APPLICATION

This application is a continuation-in-part of application Ser. No. 923,948 filed October 28, 1986.

BACKGROUND OF THE INVENTION

1 Technical Field

This invention relates to the field of materials requiring strength in high temperature environments. More particularly it relates to a material composed primarily of silicon nitride, also containing a rare earth metal oxide, but having no more than 0.5% alumina. This material is particularly suited for use as components of turbines and engines which are exposed to combustion temperatures.

2. Technical Background

Polycrystalline silicon nitride ceramics are a well known class of materials. They are commonly made by compressing either silicon or silicon nitride powder to give a coherent green body in the general shape of the final ceramic article desired. Depending on the method used for forming the green body, a fugitive binder may or may not be needed to give coherence to the green body, and a second compression step may or may not be advantageous. After adequate compression, the body is debinderized if necessary and then is finally converted into a form ready to use by a process called densification. If the body before densification consists primarily of elemental silicon, it may be converted to silicon nitride by exposure to nitrogen gas at an appropriate temperature, a process known as reaction bonding. If the body before densification is already primarily silicon nitride, densification is usually accomplished by a combination of heat and pressure.

Most metals and their oxides have lower melting points and are considerably weaker at high temperatures than silicon nitride. However, it has been found in practice that the presence of some lower melting component, called a densification or sintering aid, is necessary to allow densification of silicon nitride bodies under practically attainable conditions of temperature and pressure. The amount of sintering aid must be controlled carefully, because too much will weaken the product and too little will lead to inadequate densification. Some metals and a wide variety of oxides and mixtures of oxides, including yttria and other oxides of the rare earth metals, have been reported by others to be suitable densifying aids for silicon nitride to be used at high temperatures.

One of the most effective densification techniques is that generally known in the art as hot isostatic pressing (often abbreviated hereinafter as "HIP"). The technique of HIP best suited to manufacture of silicon nitride articles is that described in U.S. Pat. No. 4,339,271 of July 13, 1982 to Isaksson et al. Additional variations and improvements of this process, some of them particularly applicable to silicon nitride, are described in U.S. Pat. Nos. 4,081,272 of Mar. 28, 1978; 4,112,143 of Sep. 5, 1978; 4,256,688 of Mar. 17, 1981; 4,446,100 of May 1, 1984; and 4,455,275 of June 19, 1984; all to Adlerborn, either alone or with various coworkers. All these patents teach that a silicon nitride body should be degassed at a temperature of about 950° C. before being encapsulated in the glass envelope in which HIP actually occurs.

U.S. Pat. No. 4,457,958 of July 3, 1984 to Lange et al. teaches the use of diffusion techniques after densification of silicon nitride bodies to improve the creep resistance and strength by reducing the amount of intergranular phase. While this technique is not at all closely related to that of the present invention, it did achieve a reported value of 82,000 psi or 565 MPa at 1400° C. for the flexural strength of silicon nitride, one of the higher value known to the applicant from the prior art. The type of silicon nitride with which this high value for flexural strength was achieved contained deliberately added magnesia and almost certainly some silica as its primary densifying additive; it did not contain any significant amount of rare earth oxide. Although the technique taught by Lange was applied to some silicon nitride bodies which did have yttria as the primary glass forming densification aid, the flexural strength values for these samples were not reported; only improvements in creep strength were reported for these yttria-containing samples.

D. C. Larsen et al., *Ceramic Materials for Advanced Heat Engines* (1985), reviews the effect of various densifying aids on the high temperature properties of silicon nitride. This reference reports one material, containing 4% yttria and 3% alumina, which achieved flexural strengths of as much as 100,000 psi or nearly 700 MPa at about 1370 C (see graphs on pages 121 and 127.) However, it is also noted that this material "appears to be oxidation limited at 1500 C. This is thought to be due to the $Al_2O_3$ additive." (page 120). It is also believed by the present applicant that the use of alumina as a densifying aid in silicon nitride is likely to result in relatively poorer high temperature strength at low strain rates than at high strain rates, when compared with silicon nitride containing rare earth oxides such as yttria, substantially free from alumina, as the densifying aid.

The Larsen reference also notes (pages 120-24), "The success of $Y_2O_3$ as a densification aid for HP-$Si_3N_4$ lies in the fact that the resulting yttrium silicate intergranular phase can be crystallized. If more than 4% $Y_2O_3$ is used (i.e., 8% or more), we have found that there is a strong tendency to be in that part of the $Si_3N_4$-$Y_2O_3$-$SiO_2$ phase triangle that results in oxynitride phases that are unstable in oxidizing environments." In a later passage (page 221), the same reference notes that $Si_3Y_2O_3N_4$, $YSiO_2N$, and $Y_{10}Si_7O_{23}N_4$ phases are not desirable intergranular constituents because they are susceptible to rapid oxidation, which can lead to catastrophic failure of the silicon nitride bodies with such intergranular phases. However, an intergranular phases of $Y_2Si_2O_7$ is recommended as free from this difficulty.

Japanese Patent Application No. 56-185122 of Nov. 17, 1981, published May 26, 1983 under No. 58-88171, describes a method of preparing dense silicon nitride bodies by preparing green bodies, heating them in a nitrogen atmosphere, and then finally densifying the bodies by HIP. However, the heating recommended by this reference is at temperatures above 1600 C and the microstructural effect intended to be accomplished by the heating is transformation of the crystal form of the silicon nitride from alpha to beta. Flexural strengths for the products made according to this reference are given only at room temperature and 1200 C. No indication of the units intended for the flexural strength values could be found, but it is likely that units of $kg/mm^2$ were intended. The highest value reported at 1200 C is 74.

SUMMARY OF THE INVENTION

It has been found that the strength at high temperatures of silicon nitride bodies containing between 1 and 12% of rare earth oxide sintering aids and less than 0.5% alumina can be increased substantially by treating the green bodies before HIP with nitrogen gas at a temperature between 1000 and 1500 C for a time sufficient to reduce below the X-ray diffraction (XRD) detection limit the $SiO_2$ and alpha-$Y_2Si_2O_7$ phase content of the bodies after HIP. Normally a time of 20 to 60 minutes of heating is sufficient. The heat treatment also reduces the content of iron in the bodies and should thus increase the service reliability of the bodies made according to this invention, because inclusions of elemental iron present in high temperature silicon nitride articles have been observed to be associated with failure cracks and are believed to contribute to failure initiation.

By this invention silicon nitride articles with a flexural strength of more than 525 megapascals (MPa) at 1370 C can be produced. In addition, by control of grain size, the average time to rupture of articles at high constant stress levels above 225 MPa can be improved, and statistical fluctuation of the time to rupture can be reduced. Furthermore, the strain rate under high temperatures stresses can be reduced.

DESCRIPTION OF THE PREFERRED EMBODIMENTS

The invention is applicable to any composition of silicon nitride containing a sufficient amount of a rare earth sintering aid to densify under conditions suitable for HIP. A combination of rare earths, such as yttria and ceria, may be used, and additional oxides may be present. Yttria in an amount between 1 and 5 percent by weight is preferred, with an amount from 2-5% particularly preferred.

Any conventional source of silicon nitride powder and of appropriate rare earth oxides may be used. Suitable materials are commercially available silicon nitride powder with a surface area of 6-16 square meters per gram ($m^2/g$), an oxygen content of about 1.5%, and an iron content of about 0.03%, along with an yttria powder of 99.99% purity available from Molycorp, Inc. of White Plains, New York.

The silicon nitride and rare earth oxide are preferably milled together until the mixed powders have developed a surface area of at least 10 square meters per gram ($m^2/g$) as measured by conventional techniques. Satisfactory results are obtained by simple ball milling in a suitable organic solvent such as 2-propanol with silicon nitride balls, but the method of milling is not believed to be important to the invention so long as the proper particle size and intimate mixture of the materials are achieved and the introduction of deleterious impurities from the milling media is avoided.

After milling, the powder should be dried, preferably under a partial vacuum, and then formed into a green body by any suitable conventional technique, such as cold pressing in a die at about 22 MPa followed by conventional cold isostatic pressing (CIP) at 200-400 MPa. The green body from CIP is then degassed at a temperature between 750°-950° C. and subjected to heat treatment according to this invention at a temperature above 1000° C. in flowing nitrogen gas at normal atmospheric pressure. The heat treatment should be continued for a time sufficient to reduce the content of the silica phase to less than 1% and the final content of the $Y_2Si_2O_7$ phase to an amount undetectable by X-ray diffraction after HIP. Generally a time between 20 and 60 minutes is preferred for heat treatment. After the heat treatment, the sample is again degassed and subjected to conventional HIP as taught by the patents already noted.

While the invention is not limited by any particular theory, the applicant believes that the improved high temperature strength achieved results from control of the type and amount of rare earth metal silicates in the final ceramic product after HIP. Both elemental silicon and silicon nitride spontaneously form silica on their surfaces when exposed to air or other sources of oxygen at reasonable pressures, and the silica tends to concentrate in the intergranular phase. This phase also contains the deliberately added sintering aids such as the rare earth oxides, and when these are present in sufficient quantity, as they are in the preferred compositions of products according to this invention, reactions to form silicates are likely.

The compound $Y_2Si_2O_7$ is a silicate especially likely to form in materials containing the preferred yttria component. $Y_2Si_2O_7$ has been reported (by K. Liddell and D. P. Thompson, 85 *British Ceramic Society Transactions and Journal* 17-22{1986}) to be capable of three phase transitions at atmospheric pressure within a range of temperatures that is at least partially within the range used for HIP and could be encountered in practical service conditions: alpha to beta at 1225 C, beta to gamma at 1445 C, and gamma to delta at 1525 C. Volume changes are associated with these phase transitions, and such volume changes would be expected to result in microcracking of or introduction of stresses into the silicon nitride bodies formed by HIP according to the prior art. The present invention results in the absence of XRD-detectable amounts of $SiO_2$ and alpha $Y_2Si_2O_7$ phases in the bodies formed, although the elements of these phases are still present according to chemical analysis. The silicon and yttrium atoms present may be in glasses, other crystal phases of $Y_2Si_2O_7$, or other complex oxynitrides; the specific phases present have not been identified.

The scope and variety of the invention may be further appreciated from the following examples.

EXAMPLES 1-2

For these examples, silicon nitride and yttria powders as already described above were mixed together in appropriate amounts to give 4 wt % yttria in the total, slurried with 57 parts by weight of isopropyl alcohol to 43 parts of powder, and tumbled together in a ball mill with silicon nitride balls of 9.5 mm diameter until the powder had been sufficiently finely divided to have a specific surface area of 10-12 $m^2/g$. The powder was then dried in a rotating vessel at about 70 C at a partial vacuum of about 50 kPa for 2 hrs. The dried powder was pressed without any binder in a steel die at room temperature and about 25 MPa pressure to form a coherent body in the shape of a thin parallelepiped or "tile". This tile was encapsulated in a conventional polyurethane rubber membrane and subjected to CIP using water as the pressuring fluid at 200-400 MPa, then degassed as taught in U.S. Pat. No. 4,446,100 to produce a green body ready for heat treatment according to this invention.

Heat treatment was performed in a furnace supplied with a flow of nitrogen of 99.999% chemical purity. Other conditions of treatment are shown in Table 1.

After the heat treatment the tiles were degassed and subjected to HIP as taught in U.S. Pat. No. 4,446,100. A mechanical test specimen with dimensions 3×4×55 mm was machined from the densified tile and used in a four point, quarter point bend test with a 40 mm center span and a plunger rate of 5 mm/min. The bend test was performed in air at 1370° C. Results are shown in Table 1. Fracture toughness measurements were made according to a conventional indentation direct crack measurement technique on other samples prepared from the densified tiles. These results are also shown in Table 1.

The XRD peak at d=0.301 nm shown in Table 1 is one characteristic of the alpha $Y_2Si_2O_7$ phase. The XRD results were obtained on still other samples, from the same ceramic bodies densified by HIP as described above, using a Philips Model AP 3720 Automated Powder Diffractometer. This is a diffracted beam crystal monochromator using Cu K-alpha X-radiation. Powdered samples of the ceramics were examined with this machine, using electrical settings of 45 kilovolts and 40 milliamps. The sample was rotated at 1.75 degrees per second through a total rotational angle of 70 degrees. The values shown in Table 1 for Relative Intensity are per cent relative to the strongest peak for beta silicon nitride in the same sample. The detection limit of the technique is believed to correspond to about 0.5% by weight of alpha $Y_2Si_2O_7$.

In Table 1, Example Numbers shown with no prefix indicate examples according to this invention, while those with a prefix P were prepared from identical materials and identically processed, except that they were not heat treated according to this invention.

TABLE 1

Heat Treatment Time and Temperature and Resultant Alpha $Y_2Si_2O_7$ Content

| Example Number | Heat-Treatment Conditions Deg. C | Min. | Fracture Toughness, MPa/m$^{0.5}$ | Flexural Strength at 1370C, MPa | Relative Intensity of XRD Peak at d = 0.301 nm |
|---|---|---|---|---|---|
| 1 | 1450 | 30 | 4.10 | 575 | 0 |
| P1 | none | none | 3.15 | 474 | 8.11 |
| 2 | 1450 | 30 | 3.72 | 642 | 0 |
| P2 | none | none | 3.10 | 516 | 7.78 |

The total of silicon and silica determined by chemical analysis in sample 1 was about 2%, but neither of these phases was detectable by XRD, with a detection limit of about 1%, or even by electron spectroscopic analysis, which should have detected as little as 0.2 atomic %. No simple yttria phase was detectable either, indicating that substantially all the yttrium and silicon in the product are present as complex phases, but not as alpha $Y_2Si_2O_7$.

The iron content of ceramic samples made similarly to samples 1 and P1 as noted above was also measured. Iron, believed to be present as the elemental phase, amounted to 0.22 wt % of the sample like P1 but only 0.04 wt % of the sample like 1. Scanning electron microscope fractography and electron dispersive spectroscopy of fractured samples of silicon nitride bodies made according to the methods described above showed that all failures originated at iron inclusions. Thus reduction of the iron content in dense silicon nitride bodies is believed to be at least one factor contributing to reliably attaining a high fracture strength for densified silicon nitride. This greater reliability is confirmed by measured stress rupture lifetimes, as shown in the following examples.

EXAMPLE 3-5

For these examples, the same types of raw materials as for Examples 1 and 2 were used. By use of different lots of silicon nitride powder and different times of milling, the powder for Example 3 was prepared so as to have a specific surface area of 9 m$^2$/g and a particle size distribution with 50 volume % less than 0.61 microns and 90 volume % less than 1.35 microns, and this yielded a final product grain size median of 1.5 microns; the powder for Example 4 was prepared so as to have a specific surface area of 13 m$^2$/g and a particle size distribution with 50 volume % less than 0.60 microns and 90 volume % less than 1.43 microns, and this yielded a final product grain size median of 0.7 microns. Both were shaped by cold isostaic pressing at about 200 MPa pressure, degassed and heat treated in flowing nitrogen at 1450 C for thirty minutes, and then encapsulated and subjected to HIP as in Examples 1-2. Both had about 2.5% total oxygen content after final densification. Example 5 was similar to Example 4, except that the powder used to prepare it was processed to produce a specific surface area of about 12 m$^2$/g and a particle size distribution with 50 volume % less than 0.82 microns and 90 volume % less than 2.93 microns, so that it had a total oxygen content of about 2.8-3.0% and a median grain size of about 0.7 microns after final densification.

The stress rupture behavior of material from these examples was measured at 1370 C by the methods described in the publication, "Guide to the Construction of a Simple 1500 C Test Furnace", Army Materials and Mechanics Research Center Publication TR 83-1, authored by George D. Quinn. This Quinn publication is hereby incorporated herein by reference. At 250 MPa constant applied stress, five samples of Example 5 failed at about 0.1, 0.5, 3, 80, and more than 200 hours, indicating highly variable life. At 300 MPa, two samples of Example 5 failed at about 0.1 and 3 hours, while at 350 MPa three samples of Example 4 all failed between about 0.1 and 0.5 hours.

Example 4, with a lower oxygen content than Example 5 but about the same grain size, had superior stress rupture reliability. LIfe was consistently better than 200 hours at 250 MPa stress, but at 300 MPa, two samples failed at about 12 and about 160 hours.

The larger grained material of Example 3 was far more consistent in stress rupture behavior than Example 5 and still better than Example 4. Two samples of Example 3 at both 250 and 300 MPa both lasted more than 200 hours, the maximum test time tried.

For purposes of this application, a material is described as having a stress rupture life "reliably greater than" a specific value at a specified stress level and temperature when at least two random samples of the material are tested by the method described above under the same conditions, and the average stress rupture life minus the average deviation of all samples tested is greater than the specified figure. Thus, the material of Example 4 was shown to have a stress rupture life reliably better than 200 hours at 250 MPa and 1370 C by the data above, but the life of this material at 300 MPa was not reliably greater than even one hundred hours, even though one of the two samples was far above this life. Example 3 had a reliable life of better than 200 hours at both 250 MPA and 300 MPa, based on the data above.

In general, an oxygen content of not more than 2.5 an alumina content of not more than 0.5%, and a median grain size of at least 1 micron are all preferred for maximizing reliability of behavior under stress, two of these conditions are preferred over only one, and material meeting all three criteria is most preferred.

Nitrogen treatment before HIP according to this invention also is effective in reducing the strain rate of silicon nitride bodies stressed at high temperature, as indicated by the following examples.

EXAMPLES 6–7

These examples were made from the same general type of raw materials as already described above, but the oxygen content was kept exceptionally low. Example 6 had an yttria content of 4 weight % and an oxygen content of 2.3 weight %, while Example 7 had an oxygen content of 1.8 weight % and an yttria content of 2 weight %. The strain rates of these samples at 250 MPa constant stress at 1370 C was measured and compared with that of a variety of samples from the prior art and from the methods according to this invention, but with higher oxygen contents ranging from 2.4–4.9 weight %. All of these latter materials had a log average strain rate between −5.6 and −6.0 per hour, while Example 6 had a log average strain rate of −6.6 per hour and Example 7 had a log average strain rate of −7.4 per hour. Thus, reducing the oxygen content below 2.3% produces a significant reduction in the rate of volume expansion under strain, and this rate can be still further reduced by using lower levels of sintering aid.

While the examples have been concerned primarily with yttria as the rare earth sintering aid, the well known similarity of the chemical properties and ionic radii of all the rare earth metals indicates that other rare earth metals could be substituted for yttrium.

Silicon nitride objects made according to this invention are excellently suited for use as turbine blades, vanes, rotors, combustion liners, flameholders, struts, and other hot section components in gas turbines and for valves, cylinder liners, valve seats, tappets, and other hot section components in reciprocating piston engines. Products made according to this invention are also suitable for all the established uses for prior art silicon nitride objects, including but not limited to: thermocouple sheats, riser stalks for low pressure die casting, crucibles, and furnace tapping seals and plugs for foundries for non-ferrous metals, particularly aluminum; degassing tubes and lining plates for primary aluminum smelters; precision jigs and fixtures for soldering, brazing, and heat treatment processes in the manufacture of electronic and semiconductor goods, jewelry, or any other metal or glass object requiring heat treating; wear resistant fixtures for optical devices, nose guides and electrode holders for electrodischarge machining, or guides and templates for electrochemical machining; welding nozzles and insulators, components of pumps or valves for handling or containing corrosive chemicals and abrasive mixtures; artificial teeth and dental bridges; and metal cutting tools.

The greater strength and toughness of silicon nitride bodies made according to this invention will also make them useful in additional applications previously avoided for silicon nitride because of inadequate high temperature strength.

What is claimed is:

1. A polycrystalline ceramic material comprising at least three-fifths atomic fraction of silicon nitride, between 1 and 5 weight percent of a rare earth oxide, not more than 1 weight percent silica as determined by X-ray diffraction, and not more than 0.5 weight percent alumina as determined by chemical analysis, said ceramic material having a flexural strength of at least 525 megapascals when measured at 1370 C.

2. A material according to claim 1, wherein said amount of rare earth oxide is between 2 and 4 weight percent.

3. A material according to claim 2, wherein said rare earth oxide comprises between 2 and 4 weight percent yttria.

4. A material according to claim 3, comprising no amount of silicon dioxide or alpha $Y_2Si_2O_7$ detectable by X-ray diffraction.

5. A material according to claim 4 comprising no more than 0.05 weight percent iron.

6. A polycrystalline ceramic material comprising at least three-fifths atomic fraction of silicon nitride and between 1 and 5 weight percent of a rare earth oxide, said ceramic material having a reliable lifetime of at least one hundred hours under a constant stress of 250 MPA at 1370 C.

7. A material according to claim 6, comprising no more than 2.5 weight percent oxygen.

8. A material according to claim 7, having a median grain size of at least one micron.

9. A material according to claim 6 having a reliable lifetime of at least one hundred hours under a constant stress of 250 MPA at 1370 C.

10. A material according to claim 9, having a reliable lifetime of at least two hundred hours under a constant stress of 250 MPA at 1370 C.

11. A material according to claim 10, having a reliable lifetime of at least two hundred hours under a constant stress of 300 MPA at 1370 C.

12. A material according to claim 11, having a median grain size of at least one micron.

13. A polycrystalline ceramic material comprising at least three-fifths atomic fraction of silicon nitride and between 1 and 5 weight percent of a rare earth oxide, said ceramic material having a strain rate of not more than $10^{-6.3}$/hour when stressed under a constant stress of 250 MPA at 1370 C.

14. A material according to claim 13, having an oxygen content of not more than 2.3 weight percent.

15. A material according to claim 14, having an yttria content of from 1.7–2.3 weight percent.

16. In a process comprising (a) preparing a silicon nitride green body, said green body comprising at least three fifths atomic fraction of silicon nitride, from 1 to 12 weight percent of rare earth metal oxide, and not more than 0.5% alumina, (b) degassing said green body, (c) encapsulating said green body with a flexible fluid-impermeable membrane, and (d) subjecting said fluid-impermeable membrane to uniform fluid pressure while simultaneously maintaining said green body at elevated temperature, whereby said green body is densified, the improvement wherein said green body is heated in an atmosphere of nitrogen at a temperature between 1000 C and 1500 C prior to step (c), for a time sufficient to reduce below the X-ray diffraction detection limit the content of each of the $SiO_2$ and alpha $E_2Si_2O_7$ phases where E represents any rare earth metal, within the body after step (d).

17. A process according to claim 16, wherein said temperature between 1000 C and 1500 C is at least 1350 C.

18. A process according to claim 17, wherein said green body is heated prior to step (c) for a time of at least twenty minutes.

19. A process according to claim 18, wherein said rare earth metal oxide comprises yttria to the extent of at least 2 weight percent of said green body.

20. A ceramic product produced by a process according to claim 16.

* * * * *

UNITED STATES PATENT AND TRADEMARK OFFICE
CERTIFICATE OF CORRECTION

PATENT NO. : 4,904,624
DATED : February 27, 1990
INVENTOR(S) : Russell L. Yeckley It is certified that error appears in the above—identified patent and that said Letters Patent is hereby corrected as shown below:

Column 7, line 3 after "2.5" insert --%,--.

Signed and Sealed this

Eighteenth Day of August, 1992

Attest:

DOUGLAS B. COMER

*Attesting Officer*     *Acting Commissioner of Patents and Trademarks*